US008248953B2

(12) United States Patent
Kumar et al.

(10) Patent No.: US 8,248,953 B2
(45) Date of Patent: Aug. 21, 2012

(54) DETECTING AND ISOLATING DOMAIN SPECIFIC FAULTS

(75) Inventors: Rajesh Kumar, Palo Alto, CA (US); Randall P. J. Ethier, Burke, VA (US)

(73) Assignee: Cisco Technology, Inc., San Jose, CA (US)

( * ) Notice: Subject to any disclaimer, the term of this patent is extended or adjusted under 35 U.S.C. 154(b) by 499 days.

(21) Appl. No.: 11/782,906

(22) Filed: Jul. 25, 2007

(65) Prior Publication Data

US 2009/0028054 A1  Jan. 29, 2009

(51) Int. Cl.
*G01R 31/08* (2006.01)
(52) U.S. Cl. ....................................................... 370/242
(58) Field of Classification Search .......... 370/217–225, 370/228, 248, 254, 242; 709/223, 224; 398/17
See application file for complete search history.

(56) References Cited

U.S. PATENT DOCUMENTS

| | | | |
|---|---|---|---|
| 5,675,741 A | 10/1997 | Aggarwal et al. | 395/200 |
| 5,774,837 A | 6/1998 | Yeldener et al. | 704/208 |
| 5,794,183 A | 8/1998 | Müller et al. | 704/222 |
| 6,115,393 A | 9/2000 | Engel et al. | |
| 6,240,386 B1 | 5/2001 | Thyssen et al. | 704/220 |
| 6,275,471 B1 | 8/2001 | Bushmitch et al. | 370/248 |
| 6,442,706 B1 | 8/2002 | Wahl et al. | 714/6 |
| 6,466,574 B1 | 10/2002 | Fujisaki et al. | 370/356 |
| 6,512,746 B1 | 1/2003 | Sand | 370/252 |
| 6,515,967 B1 | 2/2003 | Wei et al. | 370/244 |
| 6,609,153 B1 | 8/2003 | Salkewicz | 709/223 |
| 6,614,781 B1 | 9/2003 | Elliott et al. | 370/352 |
| 6,651,207 B1 | 11/2003 | Dicker et al. | 714/746 |
| 6,681,232 B1 * | 1/2004 | Sistanizadeh et al. | 709/224 |
| 6,687,225 B1 | 2/2004 | Kawarai et al. | 370/230 |
| 6,731,609 B1 | 5/2004 | Hirni et al. | 370/260 |
| 6,741,569 B1 | 5/2004 | Clark | 370/252 |
| 6,760,312 B1 | 7/2004 | Hitzeman | 370/252 |
| 6,771,646 B1 | 8/2004 | Sarkissian et al. | |
| 6,785,735 B2 * | 8/2004 | Garakani et al. | 709/245 |
| 6,801,940 B1 | 10/2004 | Moran et al. | 709/224 |
| 6,804,244 B1 | 10/2004 | Anandakumar et al. | 370/395 |
| 6,807,156 B1 | 10/2004 | Veres et al. | 370/252 |
| 6,823,303 B1 | 11/2004 | Su et al. | 704/220 |

(Continued)

OTHER PUBLICATIONS

J. Welch, "A Proposed Media Delivery Index (MDI), rfc4445.text," IETF Standard, Internet Engineering Task Force, Apr. 1, 2006, pp. 1-10.

(Continued)

*Primary Examiner* — Anh-Vu H Ly
*Assistant Examiner* — Gbemileke Onamuti
(74) *Attorney, Agent, or Firm* — Baker Botts L.L.P.

(57) ABSTRACT

A method for detecting and isolating domain specific faults includes comparing a first media quality report for a communication from a first node with a second media quality report for the communication from a second node. The first node comprises an ingress node of a first domain for the communication and the second node comprises an egress node of the first domain for the communication. The method also includes determining that the difference between at least one aspect of the first media quality report and at least one corresponding aspect of the second media quality report exceeds a first threshold. The method further includes, upon determining that the difference exceeds the first threshold, determining a first path between the first node and the second node used by the communication. The method additionally includes isolating at least one source causing the difference between the first media quality report and the second media quality report.

19 Claims, 3 Drawing Sheets

U.S. PATENT DOCUMENTS

| | | | |
|---|---|---|---|
| 6,823,381 B1 * | 11/2004 | Harper | 370/245 |
| 6,856,601 B1 | 2/2005 | Bell et al. | 370/252 |
| 6,975,876 B1 | 12/2005 | Cast et al. | 455/466 |
| 6,985,901 B1 | 1/2006 | Sachse et al. | 707/10 |
| 7,043,237 B2 | 5/2006 | Snyder et al. | 455/425 |
| 7,046,636 B1 * | 5/2006 | Shaffer et al. | 370/252 |
| 7,046,929 B1 * | 5/2006 | Hester et al. | 398/17 |
| 7,051,098 B2 | 5/2006 | Masters et al. | 709/224 |
| 7,237,138 B2 | 6/2007 | Greenwald et al. | 714/4 |
| 7,246,101 B2 | 7/2007 | Fu et al. | |
| 7,266,602 B2 | 9/2007 | Givoly | |
| 7,321,565 B2 | 1/2008 | Todd et al. | 370/253 |
| 2002/0051464 A1 | 5/2002 | Sin et al. | |
| 2002/0097743 A1 | 7/2002 | Baydar et al. | |
| 2002/0178397 A1 | 11/2002 | Ueno et al. | |
| 2003/0033403 A1 | 2/2003 | Rhodes et al. | 709/224 |
| 2003/0128692 A1 | 7/2003 | Mitsumori et al. | 370/352 |
| 2003/0149919 A1 | 8/2003 | Greenwald et al. | 714/43 |
| 2004/0078683 A1 | 4/2004 | Buia et al. | 714/37 |
| 2004/0111507 A1 | 6/2004 | Villado et al. | |
| 2004/0136327 A1 | 7/2004 | Sitaraman et al. | 370/252 |
| 2004/0221198 A1 | 11/2004 | Vecoven et al. | 714/25 |
| 2005/0138111 A1 | 6/2005 | Aton et al. | 709/201 |
| 2006/0034188 A1 | 2/2006 | Oran et al. | 370/254 |
| 2007/0124802 A1 | 5/2007 | Anton et al. | |
| 2007/0286351 A1 * | 12/2007 | Ethier et al. | 379/32.01 |

OTHER PUBLICATIONS

PCT Notification of Transmittal of the International Search Report and the Written Opinion of the International Searching Authority, or the Declaration, May 6, 2009, 15 pages.

Arbel et al., U.S. Appl. No. 12/043,203, filed Mar. 6, 2008, "Monitoring Quality of a Packet Flow in Packet-Based Communication Networks," patent application.

SNMP Commands, http://cisco.com/univercd/cc/td/doc/product/mels/15530/command/hcr_snmp.htm, pp. 1-11, Printed Apr. 19, 2006.

S. Chisholm et al., Network Working Group, "Alarm Management Information Base (MIB)," http://www.ietf.org/rfc/rfc3877.txt?number=3877, pp. 1-71, 2004.

T. Friedman et al., Network Working Group, "RTP Control Protocol Extended Reports (RTCP XR)," http://www.rfc-editor.org/rfc/rfc3611.txt, pp. 1-52, 2003.

H. Schulzrinne, Network Working Group, "RTP: A Transport Protocol for Real-Time Applications," http://www.ietf org/rfc/rfc3550.txt, pp. 1-98, 2003.

Andreasen, et al., RTP No-Op Payload Format, Internet-Draft, Feb. 2004, pp. 1-8, Internet Engineering Task, Feb. 2004.

Rosenberg, et al., STUN—Simple Traversal of User Datagram Protocol (UDP) Through Network Address Translators (NATs), RFC 3489, Mar. 2003, pp. 1-44, Network Working Group, Mar. 2003.

Information Sciences Institute, University of Southern California, "Internet Protocol Darpa Internet Program Protocol Specification," Sep. 1981 (pp. 1-49), Sep. 1981.

Information Sciences Institute, University of Southern California, "Transmission Control Protocol Darpa Internet Program Protocol Specification," Sep. 1981 (pp. 1-88).

Information Sciences Institute, University of Southern California, R. Braden, Internet Engineering Task Force, "Requirements for Internet Hosts—Communication Layers," Oct. 1989 (pp. 1-115).

Oran, et al., U.S. Appl. No. 10/723,118, filed Nov. 26, 2003, entitled "Method and Apparatus for Analyzing a Media Path in a Packet Switched Network."

Kumar, et al., U.S. Appl. No. 11/379,312, filed Apr. 19, 2006, entitled "Method and System for Alert Throttling in Media Quality Monitoring."

Bangalore, et al., U.S. Appl. No. 11/711,448, filed Feb. 26, 2007, entitled "Diagnostic Tool for Troubleshooting Multimedia Streaming Applications."

Ethier, et al., U.S. Appl. No. 11/419,913, filed May 23, 2006, entitled "Method and System for Adaptive Media Quality Monitoring."

Wing, et al., U.S. Appl. No. 11/614,843, filed Dec. 21, 2006, entitled "Improved Traceroute Using Address Request Messages."

Arbel et al., U.S. Appl. No. 12/043,203, filed Mar. 6, 2008 entitled *Monitoring Quality of a Packet Flow in Packet-Based Communication Networks*, Communication from the U.S. Patent and Trademark Office.

Ethier et al., U.S. Appl. No. 11/419,913, Final Office Action from the U.S. Patent and Trademark Office dated Dec. 7, 2010.

Ethier et al., U.S. Appl. No. 11/419,913, Office Action from the U.S. Patent and Trademark Office dated Jun. 23, 2010.

* cited by examiner

DETECTING AND ISOLATING DOMAIN SPECIFIC FAULTS

TECHNICAL FIELD

The present disclosure relates generally to communications systems and, more particularly to detecting and isolating domain specific faults.

BACKGROUND

As the internet continues to grow in popularity and pervasiveness so do the products and services that use it. The large number of internet users spread throughout the world and the wide variety of hardware components and software used therein presents numerous opportunities for the media stream to become impaired. Such impairments may include a low signal level, a high noise level, or a low mean opinion score. The impairments may, for example, be caused by packet loss between the two endpoints, excessive traffic at any of the components between the two endpoints, endpoints out of sync with each other, or incompatible hardware or software between the two endpoints or other components. The possibility of media degradation has caused some users to be hesitant about switching from traditional products or services to products or services that use internet protocol (IP).

To help ensure the quality of the products and services enabled by the internet, some products and services include diagnostic capabilities that may report the quality of the service. These diagnostic services typically measure the quality of, for example, a call at the receiving end. Thus, it is possible to know the end-to-end quality of the call being received by the user.

BRIEF DESCRIPTION OF THE DRAWINGS

To provide a more complete understanding of the features and advantages of particular embodiments, reference is made to the following description, taken in conjunction with the accompanying drawings, in which.

DESCRIPTION OF EXAMPLE EMBODIMENTS

Overview

In accordance with particular embodiments, a method includes comparing a first media quality report for a communication from a first node with a second media quality report for the communication from a second node. The first node comprises an ingress node of a first domain for the communication and the second node comprises an egress node of the first domain for the communication. The method also includes determining that the difference between at least one aspect of the first media quality report and at least one corresponding aspect of the second media quality report exceeds a first threshold. The method further includes, upon determining the difference exceeds the first threshold, determining that a first path between the first node and the second node used by the communication. The method additionally includes isolating at least one source causing the difference between the first media quality report and the second media quality report.

DESCRIPTION

Figure 1:
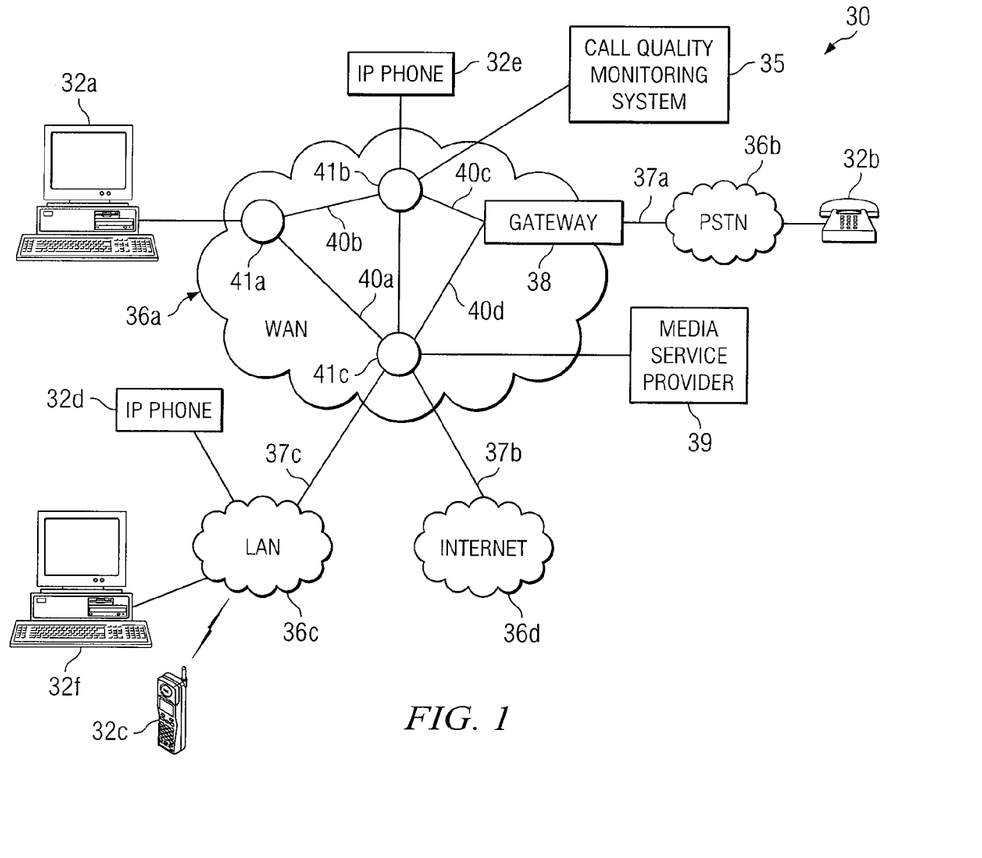
FIG. 1 illustrates a communication system including a plurality of endpoints operable to communicate among each other using internet protocol, in accordance with a particular embodiment.

FIG. 1 illustrates a communication system including a plurality of endpoints operable to communicate among each other using internet protocol, in accordance with a particular embodiment. Communication system 30 includes a plurality of endpoints 32a-32f having the ability to establish calls between each other. The communications of the call may pass through one or more of network domains 36a-36d. Communication system 30 also includes nodes 41, call quality monitoring system (CQMS) 35, and media service provider (MSP) 39. Endpoints 32a-32f, nodes 41 and CQMS 35 may have the ability to communicate diagnostic information between each other and/or MSP 39. This diagnostic information may be used in determining if a communication has experienced quality problems and whether or not a particular network domain contributed to the degradation of the quality of the communication. More specifically, the quality of a communication as it enters a particular network domain, such as network domain 36a, may be compared to the quality of the communication as it leaves the network domain. The difference between the two measurements of the communication's quality indicates the extent, if any, that a particular network domain contributed to the degradation of the communication. If a particular domain has contributed to the degradation of the communication, the components within the domain that made up the path used for the communication may be tested to isolate the cause of the degradation.

The diagnostic information may include metric reports containing information concerning various aspects of a call between two endpoints. For example, the metric reports may include packet loss metrics, delayed metrics, jitter metrics, echo metrics, signal level metrics, noise level metrics, failed connection metrics, end-to-end delay metrics, speech and silence metrics, concealed seconds metrics, and severely concealed seconds metrics The metric report may be based on one or more particular metrics that may have been used to monitor, record, compare, rate or otherwise analyze a specific feature(s) of the call. The metric report may be transmitted at the end of each call, at some point during the call (e.g. a predetermined time after the call is initiated or upon the occurrence of a specific event) or periodically during the life of the call. The metric report may be referred to as, or may be included in, a media quality report.

Calls shall include the sending or receiving of communications that comprise any type of media transmitted using any audio and/or video means, including signals, data or messages transmitted through any suitable technology, such as voice devices, text chat, web sessions, streaming media (e.g., streaming video), downloadable media, real-time communications, facsimile, on-line gaming, instant messaging and e-mail. Furthermore, a call may be used interchangeably with a communication session.

Technical advantages of particular embodiments include identifying which network entity or entities within a particular domain are contributing to the degradation of a communication passing through the domain. Accordingly, if a domain fails to meet its service level agreement (SLA) requirements (on a per real-time media stream basis) a domain operator may be able to isolate the root cause of the failure within his domain. If the failure occurs outside of the domain operator's domain, he may be able to provide evidence to show that it was not his domain that caused the degradation. Other technical advantages may be readily apparent to one skilled in the art from the figures, descriptions and claims disclosed herein. Moreover, while specific advantages have been enumerated above, various embodiments may include all, some, or none of the enumerated advantages.

Network domains 36 (sometimes referred to as a subnetwork) comprise a collection of components, such as routers, servers, nodes, and gateways, that are under the control of a single computer system, security database, service provider, organization, entity or any other single responsible component or entity. In the illustrated embodiment, network domain 36a is a wide area network (WAN) that enables calls between a plurality of endpoints 32a-32f and signaling between endpoints 32, nodes 41, CQMS 35, and/or MSP 39. WAN 36a may be distributed across multiple cities and geographic regions, and may be referred to as a metro area network (MAN). Network domain 36b is a public switched telephone network (PSTN) and couples endpoint 32b with WAN 36a through gateway 38. Communication network 36c is a local area network (LAN) that couples endpoints 32c, 32d, and 32f with network domain 36a. Accordingly, users of endpoints 32a-32f, may establish calls between and among each network component coupled for communication with one or more of network domains 36a-36d. Communication links 37a, 37b and 37c couple network domain 36a with PSTN 36b, Internet 36d, and LAN 36c.

In the illustrated embodiment, communication system 30 includes MSP 39 that facilitates calls among users based on the service provided by MSP 39. For example, MSP 39 may facilitate a voice over internet protocol (VoIP) call between endpoints 32a and 32c. In particular embodiments MSP 39 may provide: (1) a VoIP service, (2) a video over IP service, (3) an on-line gaming service, (4) an IPTV (Internet Protocol based TV) service or (5) any other functionality typically provided by MSPs in communication systems. In some embodiments MSP 39 may include a media server that may itself function as an automated endpoint. For example, MSP 39 may include a media server that stores video files or voicemail messages for users of MSP 39.

Network domain 36a includes CQMS 35. For simplicity CQMS 35 is depicted as only being directly connected to node 41b, however in practice CQMS 35 may be directly or indirectly coupled to several, or all, of the nodes within network domain 36a. In some embodiments CQMS 35 may be integrated within or part of an endpoint or one of nodes 41. In some embodiments, CQMS 35 may be functionally located between endpoints such that it may monitor the quality of calls between the endpoints. For example, CQMS 35 may be part of, or comprise, a sniffer.

Regardless of where CQMS 35 is located, it may monitor the quality of communications sent between the same type of endpoints, such as between computers 32a and 32f, or between different types of endpoints, such as IP phone 32c and PSTN phone 32b. CQMS 35 may also be used for receiving, analyzing, storing and/or indexing diagnostic reports, media quality reports, metric reports and/or logs of the diagnostic information sent by, for example, endpoints 32 or nodes 41. CQMS 35 may use this information to generate and store additional information. For example, CQMS 35 may compare various aspects of media quality reports from two nodes to determine the existence and/or extent of any degradation to the quality of a communication that passed through network domain 36a. The data stored by CQMS 35 may, for example, be retrieved by a network technician using a PC. In doing so he may, in some instances, use a graphical user interface (GUI) that allows him to interact with CQMS 35. The data stored by CQMS 35 may also be used by MSP 39 in determining billing rates for its customers or in troubleshooting problems with the service they are providing. This information may allow network domain 36a to be able to quickly identify whether or not it degraded the quality of the communication. Because this determination is specific to a particular network domain it may often be the case that CQMS 35 relies on edgepoints from its domain or sniffing end-to-end media quality reports to determine if there has been problem with a communication. Thus, it may be desirable for each network domain to have its own CQMS.

Network domain 36a includes a plurality of segments 40 and nodes 41 that couple endpoints 32a and 32e with gateway 38 and communication networks 36b-36d. Therefore, a user of endpoint 32a is provided with access to endpoints 32b-32f. Furthermore, endpoints 32a-32f, nodes 41, CQMS 35 and MSP 39 may all communicate control and data signals among each other. Nodes 41 may include any combination of network components, session border controllers, gatekeepers, call managers, conference bridges, routers, hubs, switches, gateways, endpoints, edgepoints, or any other hardware, software, or embedded logic implementing any number of communication protocols that allow for the exchange of packets in communication system 30. An edgepoint may be a realtime transport protocol (RTP) media relay point that, in effect, defines a boundary for a particular network domain (e.g., network domain 36a). An edgepoint may also be a termination point where an RTP session ends. An edgepoint may be incorporated within one or more of the devices or components depicted in FIG. 1. For example, node 41c may be an edgepoint because, while it may be a part of network domain 36a, it may send and receive communications with entities within both network domain 36a and 36c. Other possible devices that may incorporate an edgepoint include a session border controller and a policy execution point. The use of an edgepoint may aid a network administrator in ascertaining the contribution of his network to any impairment a call may experience. More specifically, because an edgepoint is essentially at the border of a network domain, it is the first or last node of the domain to receive or send a communication. Thus, the edgepoint may be able to report the quality of the communication as it is received or as it leaves the domain. Network domains 36b-36d may comprise components similar to those of network domain 36a.

Although the illustrated embodiment includes four network domains 36a-36d, the term "network domain" or simply "network" should be interpreted as generally defining any network capable of transmitting audio and/or video communication signals, data, and/or messages, including signals, data or messages transmitted through text chat, instant messaging and e-mail. Any one of networks domains 36a-36d may be implemented as a local area network (LAN), wide area network (WAN), global distributed network (e.g., the Internet), Intranet, Extranet, or any other form of wireless or wireline communication network. In addition, network domains 36 in accordance with various embodiments may include any number of MSPs 39, CQMSs 35, or nodes 41. Generally, network domain 36a provides for the communication of packets, cells, frames, or other portions of information (generally referred to as packets herein) between endpoints 32a-32f, nodes 41, CQMS 35 and MSP 39 as part of media quality monitoring. Network domain 36a may include any number and combination of segments 40, nodes 41, endpoints 32a-32f, MSPs 39, gateways 38 or CQMSs 35.

In a particular embodiment, network domain 36a may employ media communication protocols that allow for the addressing or identification of endpoints, nodes, and/or CQMSs coupled to network domain 36a. For example, using Internet protocol (IP), each of the components coupled together by network domain 36a in communication system 30 may be identified in information directed using IP addresses. In this manner, network domain 36a may support any form and/or combination of point-to-point, multicast, unicast, or other techniques for exchanging media packets among components in communication system 30. Any network components capable of exchanging audio, video, or other data using frames or packets are included within the scope of particular embodiments.

Network domain 36a is coupled to other IP networks including, but not limited to, LAN 36c and Internet 36d. Since IP networks share a common method of transmitting data, communication signals may be transmitted between telephony devices located on different, but interconnected, IP networks. In addition to being coupled to other IP networks, network domain 36a may also be coupled to non-IP communication networks through the use of interfaces and/or components such as gateway 38. In the illustrated embodiment, network domain 36a is coupled to PSTN 36b through gateway 38. PSTN 36b may include switching stations, central offices, mobile telephone switching offices, pager switching offices, remote terminals, and other related communications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows communications to be transmitted over an IP network may comprise Voice over IP (VoIP), or simply Voice over Packet (VoP). In the illustrated embodiment, endpoints 32a and 32c-32f, nodes 41, CQMS 35, MSP 39, and gateway 38 may include IP telephony capabilities allowing them to participate in and/or monitor audio, video, and other multimedia communication sessions. IP telephony devices have the ability to encapsulate a user's voice (or other input) into IP packets so that the voice can be transmitted within network domain 36a. IP telephony devices may include telephones, fax machines, computers running telephony software, nodes, gateways, wired or wireless devices, hand held PDAs, or any other device capable of performing telephony functions over an IP network.

In particular embodiments, one or more of network domains 36 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32f, nodes 41, CQMS 35, MSP 39 and/or gateway 38 may be any combination of hardware, software, and/or encoded logic that provides communication services to a user. For example, endpoints 32a-32f may include a telephone, a computer running telephony or multi-media software, a media server, a video monitor, a camera, an IP phone, a cell phone or any other communication hardware, software and/or encoded logic that supports the communication of packets of media (or frames) using network domain 36a. Endpoints 32a-32f may also include unattended or automated systems, gateways, other intermediate components or other devices that can establish calls. Although FIG. 1 illustrates a particular number and configuration of endpoints, segments, nodes, and gateways, communication system 30 contemplates any number or arrangement of such components for communicating media. In addition, elements of communication system 30, such as CQMS 35, may include components centrally located (local) with respect to one another or distributed throughout communication system 30.

Figure 2:
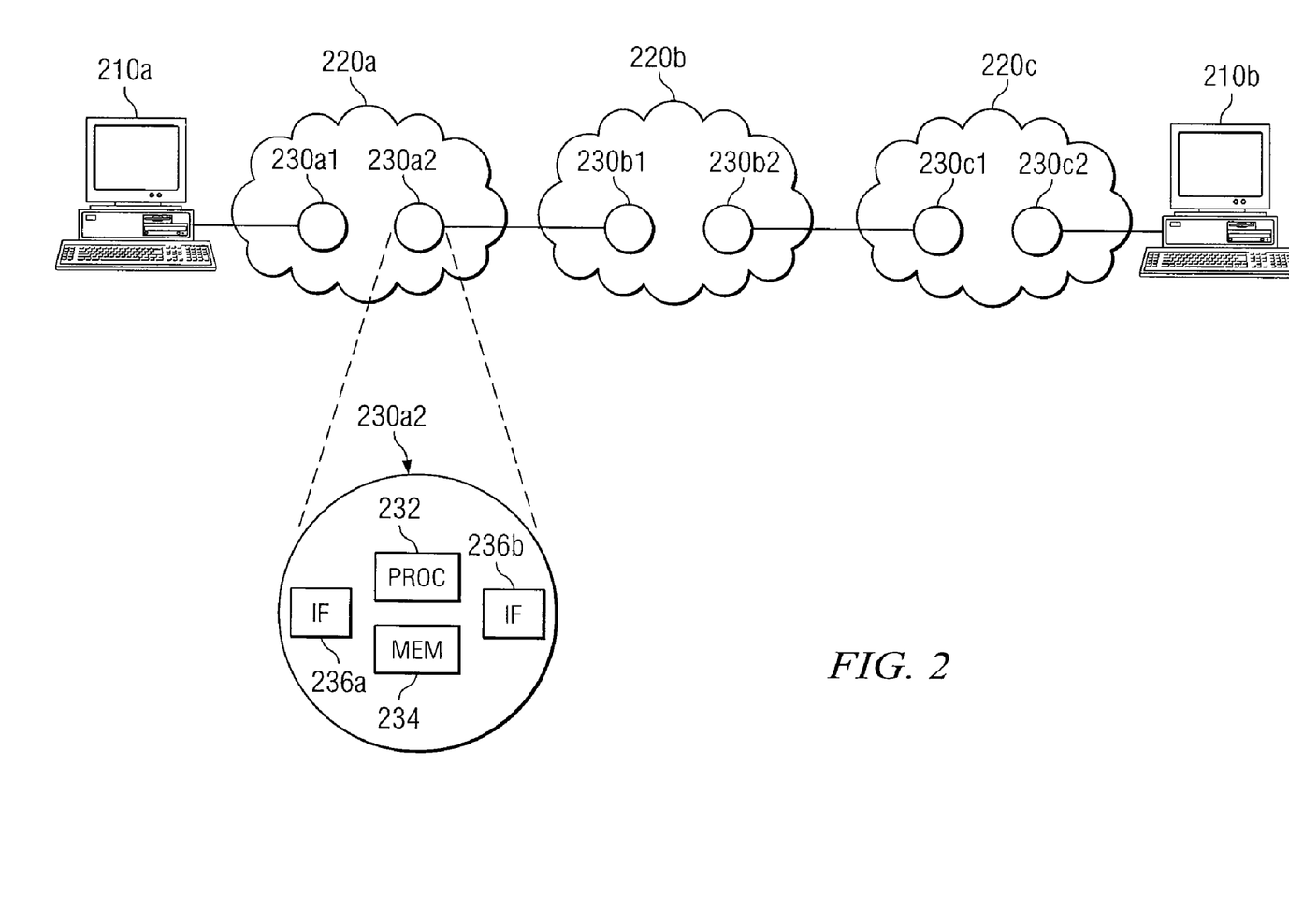
FIG. 2 illustrates three network domains used during a call between two endpoints, in accordance with a particular embodiment.

FIG. 2 illustrates three network domains used during a call between two endpoints, in accordance with a particular embodiment. More specifically, endpoints 210a and 210b are coupled to one another via network domains 220a, 220b and 220c. Network domains 220 may be similar to network domains 36 of FIG. 1. Accordingly, network domains 220 may include any of the components, and utilize any of the protocols, discussed above with respect to FIG. 1. While network domains 220 may include a plurality of nodes and other components, for simplicity only the relevant border nodes have been depicted. Depending on the scenario, these nodes may be referred to as border bearer nodes, session border controllers, IP to IP gateways, or edgepoints or any other suitable term. Regardless of the term used, one of the characteristics of this type of node may be that it is located at a domain border and relays or terminates media. For purposes of this description the depicted nodes will be referred to as edgepoints 230.

Any of the components of any of network domains 220 may include any hardware, software, logic or combination of hardware, software and/or logic that may be used in performing any of the functions or features (e.g., checking the quality of a communication, comparing the ingress and egress quality of a communication, isolating a cause of a communication degradation) described herein. For simplicity, only the components of edgepoint 230a2 have been depicted. Edgepoint 230a2 includes two interfaces 236 that may be operable to send and receive communications, communication quality reports (e.g., metric reports), and/or control signals to and from various other nodes, endpoints 210 and/or edgepoints 230. Edgepoint 230a2 also includes processor 232. Processor 232 may be a microprocessor, controller, or any other suitable computing device, resource, or combination of hardware, software and/or encoded logic. Processor 232 may execute various responses according to its analysis of the quality of the call, a particular communication during the call, the quality of other calls and/or other communications from other calls. In some embodiments, processor 232 may compare its analysis of a communication with the analysis of the communication from another edgepoint (e.g., the analysis performed by edgepoint 230a1's processor) to determine if domain 220a has caused any degradation to the communication, and if not whether the degradation occurred upstream or downstream of domain 220a. Edgepoint 230a2 may also include memory module 234 that may be any form of volatile or non-volatile memory including, without limitation, magnetic media, optical media, random access memory (RAM), read-only memory (ROM), removable media, or any other suitable local or remote memory component. Memory module 234 may store any suitable information to implement features of various embodiments, such as the parameters of particular media metrics. Memory module 234 may also maintain logs containing details of the quality of prior communications and/or of any comparisons that have been made between the ingress and egress quality of a communication.

Within any of domains 220 there may be several additional nodes (not depicted) between the two respective edgepoints 230 of that domain (e.g., edgepoint 230a1 and 230a2 of domain 220a). Some of these nodes may be used by a path between two edgepoints (e.g., edgepoints 230c1 and 230c2) of a domain (e.g., network domain 220c). The path between two edgepoints 230 in one direction, for example from edgepoint 230a1 to 230a2, may be different than the return path, for example from edgepoint 230a2 to 230a1. The information sent along these paths may not only include the underlying data (e.g., the dialogue of a call, the frames of a video, the email, webpage, song, etc.) but also diagnostic information (e.g., a particular metric report). The diagnostic information may be used in ascertaining the quality of communications transmitted between endpoints 210. In particular embodiments the quality of a communication as it entered a domain may be compared with the quality of the communication as it left the domain. Based on the comparison of the two qualities, it may be possible to determine if the respective network domain contributed any degradation to the quality of the communication. For example, the quality of a communication at edgepoint 230b1 may be compared to the quality of the communication at edgepoint 230b2 to determine the extent network domain 220b caused any degradation to a communication being sent from endpoint 210a to endpoint 210b. Because this is a domain specific determination, end-to-end media quality reports (e.g., RTP or real-time transport control protocol (RTCP) reports) may be the only outside diagnostic information examined.

Particular embodiments may attempt to isolate the cause of the degradation if it is determined that the difference between the ingress and egress quality of a communication exceeds a predetermined level. More specifically, if it is determined that a domain, such as network domain 220b, has caused an unacceptable level of degradation to the quality of a communication a trace route may be initiated to determine the path used by the degraded communication. Then, once the path is known, synthetic media stream path segment tests may be conducted to isolate the portion or component along the path that caused the degradation.

Edgepoints 230 may check the quality of a communication as it passes through network domains 220 depending on the embodiment and the situation. For example, in some embodiments edgepoints 230 may check the quality of each communication that is received, a random or periodic sampling of the communications that are received, at a certain interval from when the call is first initiated, or some combination of the above.

The ingress and egress quality of the communication for a particular network domain may be compared each time the ingress edgepoint and egress edgepoint have checked the quality of a communication or at some reduced rate. For example, the ingress and egress quality of a communication may only be compared in some cases if endpoint 210b indicates that the end-to-end communication was of unacceptable quality, regardless of how often edgepoints 230 check the quality of communications. As another example, the ingress and egress quality of a communication may only be compared in some cases if the quality of the communication is below a certain threshold as it passes through one of the edgepoints, regardless of how often the edgepoints check the quality of the communication.

Where the comparison is made may also vary by embodiment. In some embodiments the comparison may be made at a particular edgepoint, such as the egress edgepoint. For example, the ingress edgepoint may send a metric report detailing the quality of a communication along with the communication. In particular embodiments the comparison may be made by another component other than one of the edgepoints. For example, the comparison may be made by a CQMS. If a CQMS is used to compare the ingress and egress quality of a communication, the ingress and egress edgepoints may send the CQMS their media quality report detailing the quality of the communication. Regardless of where the comparison is made, the result of the comparison may indicate whether there was significant degradation to the communication within the respective domain and if not whether the degradation occurred upstream or downstream of the respective domain.

If the comparison indicates that the network domain has created an unacceptable level of degradation to the communication then a trace route may be initiated to determine the path used by the communication. This path is then used to determine which nodes or edgepoints are to be sent realtime transport protocol (RTP) test packets and from where they should be sent. More specifically, some nodes or edgepoints may be able to receive RTP test packets while other nodes or edgepoints may be able send RTP test packets as well as receive them. The results from the RTP test packets may be analyzed and/or compared to isolate the cause of the degradation.

The following examples are presented to better understand some of the myriad of options, features, and alterations that may be employed in different embodiments and/or scenarios. Assume that endpoints 210a and 210b are involved in a call using a streaming media service such as IPTV. At some point during the call endpoint 210a sends a communication to endpoint 210b that arrives in a garbled state such that the user of endpoint 210b was not able to understand the communication.

In a first example assume that the domain administrator for network domain 220a wants to configure her domain so that if there is a problem with a communication she knows if it was her domain's fault as soon as possible. Accordingly, she may have configured the edgepoints of her domain to check the quality of each communication it receives and to send a metric report to the egress edgepoint after each communication. Thus the egress edgepoint is able to compare the quality of each communication as it enters the domain with the respective quality of the communication as it leaves the domain without having to wait for any additional triggers, information and/or messages (e.g., a message indicating that the communication's end-to-end quality was below a certain threshold).

In this first example, once edgepoint 230a1 has finished checking the quality of the communication and has generated the media quality report detailing certain quality aspects of the communication from endpoint 210a, edgepoint 230a1 may send the report to edgepoint 230a2. Edgepoint 230a2 may then be able to use the metric report from edgepoint 230a1 along with its own check of the quality of the communication to determine the extent, if any, domain 220a has degraded the quality of the communication. If the metric report from edgepoint 230a1 indicates that the quality of the communication was more than a threshold amount better than the quality of the communication as detected by edgepoint 230a2 then edgepoint 230a2 may determine that domain 220a has degraded the quality of the communication. If the ingress and egress quality are similar then edgepoint 230a2 may determine that domain 220a has not caused any significant degradation to the quality of the communication. Furthermore, if the ingress and egress quality of the communication are both below a predetermined lower level, edgepoint 230a2 may determine that the cause of the degradation occurred upstream from domain 220a; and if the ingress and egress quality of the communication are both above a predetermined upper level, edgepoint 230a2 may determine that any degradation that may occur to that particular communication occurred downstream of domain 220a.

In a second example assume that the domain administrator for network domain 220*b* wants to use a CQMS to perform any call quality comparisons. Further assume that she has configured the edgepoints of domain 220*b* to periodically send their media quality report to the CQMS. The period may be based on factors such as time (e.g., every thirty seconds), the number of communications (e.g., every fourth communication) or a combination of the above (e.g., every other minute sample one out over every five communications). The edgepoints may also send their media quality reports to the CQMS if the quality of a communication arriving at an edgepoint is below a predetermined threshold or if they receive a message indicating that the communication has become unacceptably degraded. For example, if one of endpoints 210 detects that the end-to-end communication quality is below a certain threshold (e.g., endpoint 210*b* detects an unacceptable metric score for a communication from endpoint 210*a*) it may send a message indicating the particular metric score for the communication was unacceptably low; this message may be detected by any of the edgepoints, including edgepoints 230*b*, or CQMSs along the path from endpoint 210*b* to endpoint 210*a*. Once the CQMS receives a metric report from two edgepoints regarding the same communication then it may be able to compare the ingress and egress communication quality. In some embodiments, if the CQMS receives a media quality report from only one edgepoint then the CQMS may request that the other edgepoint send its media quality report so that the ingress and egress communication quality may be compared.

In the second example, if the communication from endpoint 210*a* becomes degraded by domain 220*a* and passes through domain 220*b* during a period in which the CQMS of domain 220*b* is performing media quality comparisons then edgepoint 230*b*1 may send a metric report to the CQMS. Similarly, edgepoint 230*b*2 may send a metric report once it performs its quality check of the communication. When the CQMS compares the two metric reports it may determine that because both edgepoints 230*b*1 and 230*b*2 detected that the communication was of poor quality the degradation of the communication lies upstream (e.g., within domain 220*a*). If the communication from endpoint 210*a* becomes degraded as it passes through domain 220*b*, then when edgepoint 230*b*2 receives the communication and performs its quality check of the communication it may send a metric report to the CQMS. In some embodiments the CQMS may assume that since it did not receive a metric report from edgepoint 230*b*1 the communication was of acceptable quality when it was received by edgepoint 230*b*1. Based on the metric report from edgepoint 230*b*2 and the assumption that the communication was of acceptable quality when it was received by edgepoint 230*b*1, the CQMS may determine that the communication degraded within domain 220*b*. In particular embodiments, because the CQMS only received a metric report from edgepoint 230*b*2 it may request a metric report from edgepoint 230*b*1. CQMS may request the report from edgepoint 230*b*1 to ensure that the communication was in fact of acceptable quality as it entered domain 220*b* and not that the metric report was lost before arriving at the CQMS. If the communication becomes degraded in domain 220*c* or if the communication passed through domain 220*b* during a period in which the ingress and egress quality was not compared then the CQMS may not be aware that there was a problem with the communication until, for example, endpoint 210*b* sends a message or report indicating that there was an end-to-end problem with the communication. In some embodiments the CQMS may assume that since neither edgepoint 230*b*1 or 230*b*2 sent a metric report the communication must have been degraded downstream from domain 220*b*. In particular embodiments, upon detecting the end-to-end problem, edgepoints 230*b*1 and 230*b*2 may send their metric reports to the CQMS so that the CQMS can confirm that the problem with the communication occurred downstream of domain 220*b*.

In a third example assume that the domain administrator for network domain 220*c* has configured each edgepoint to only send a metric report to a CQMS for comparison if there is an end-to-end problem with the communication. Further assume that the CQMS operates as a sniffer to detect if an endpoint experiences an end-to-end problem with a communication. Thus, when endpoint 210*b* receives the garbled communication and sends a message indicating the quality of the communication was unacceptable (e.g., an RTP or RTCP report), the CQMS may detect the message and request that edgepoints 230*c*1 and 230*c*2 send their metric reports for the communication. As before, the CQMS may compare the ingress and egress quality of the communication based on the metric reports from edgepoints 230*c*1 and 230*c*2, respectively. Also, as before, the comparison may be used to determine if the degradation occurred upstream, downstream or within network domain 220*c*.

In the three examples above, once a difference between the ingress and egress quality of a communication exceeding a predetermined threshold has been detected the path used for the communication may be determined. For example, in the second example the CQMS may send a message requesting edgepoint 230*b*1 initiates a layer 3 trace route. The CQMS may send the request to edgepoint 230*b*1, instead of edgepoint 230*b*2, because in a full duplex network domain the path of a communication may be different traveling towards endpoint 210*a* than it is traveling towards endpoint 210*b*. This allows the trace route to follow the same path and in the same direction as the degraded communication.

Once the path is known, a series of synthetic media stream path segment tests (e.g. tests using RTP test packets) may be performed. These tests may be initiated from the same source, such as edgepoint 230*b*1, or they may be initiated by multiple nodes along the path. For example, assume that the path through network domain 220*b* begins with edgepoint 230*b*1, passes through nodes 1, 2, 3 and then exits domain 220*b* via edgepoint 230*b*2. If edgepoint 230*b*1 and nodes 1, 2, 3 are all able to send and receive test packets then each component along the path may establish a brief one-way session with the next component along path. More specifically, edgepoint 230*b*1 may send a test packet to node 1, node 1 may send a test packet to node 2, node 2 may send a test packet to node 3 and node 3 may send a test packet to edgepoint 230*b*2. In some embodiments the series of test packets may be sent sequentially. More specifically, the CQMS may instruct edgepoint 230*b*1 to send the first packet to node 1. When node 1 receives the test packet it may send the next test packet to node 2. In some embodiments all the test packets may be sent at approximately the same time. More specifically, the CQMS may instruct all the components along the path to send their test packet. If nodes 1, 2, and 3 are not able to send test packets then edgepoint 230*b*1 may establish a brief one-way session with each component along the path. More specifically, edgepoint 230*b*1 may send a first test packet to node 1, a second test packet to node 2, a third test packet to node 3 and a fourth test packet to edgepoint 230*b*2. The results of various test packets may then be compared and analyzed to determine where along the path the degradation is occurring.

It may be recognized that the arrangement of endpoints 210 and network domains 220 is merely one example configuration, other calls may include any number of edgepoints, network domains and endpoints. Furthermore, other network domains may include different types, numbers and/or arrangements of components. For example, a network domain may include a CQMS for comparing and storing communication quality information.

Figure 3:
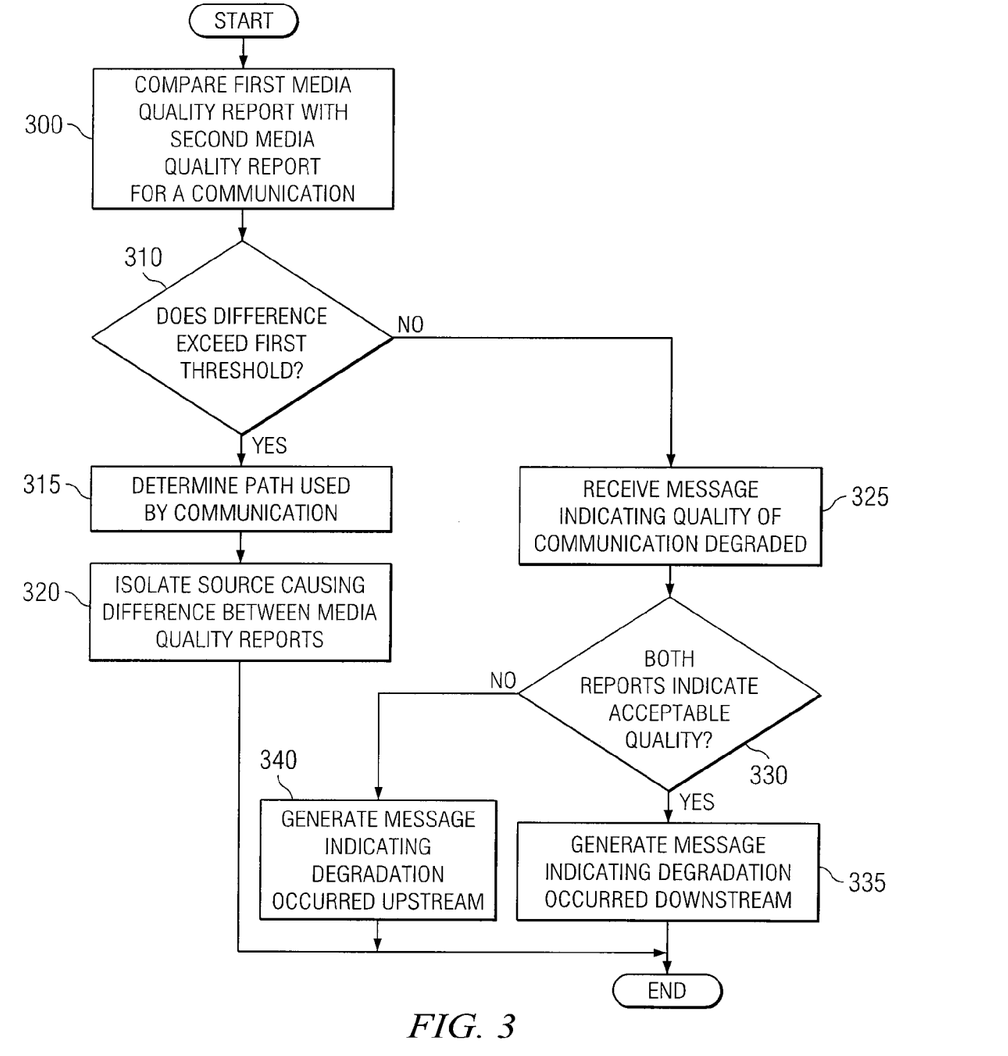
FIG. 3 illustrates a method for detecting and isolating domain specific faults, in accordance with a particular embodiment.

FIG. 3 illustrates a method for detecting and isolating domain specific faults, in accordance with a particular embodiment. For purposes of discussing the steps depicted in FIG. 3 assume that a first endpoint has sent a first communication (the first communication is not necessarily the first communication sent during a given communication session) to a second endpoint and that the first communication passes through a domain utilizing the steps shown in FIG. 3. Further assume that this domain has been configured such that ingress and egress nodes transmit a media quality report with each communication that passes through the domain.

The method begins at step 300 with a comparison of a first media quality report with a second media quality report. Both the first media quality report and the second media quality report may provide diagnostic or communication quality information regarding the first communication. The information within the media quality reports may be collected, for example, by the edgepoints measuring, detecting, rating, comparing and/or otherwise analyzing different aspects of the communications that pass through the edgepoints. In certain embodiments, the edgepoints may use metrics, such as packet loss metrics, delayed metrics, jitter metrics, echo metrics, signal level metrics, noise level metrics, failed connection metrics, end-to-end delay metrics, speech and silence metrics, concealed seconds metrics, and severely concealed seconds metrics. Furthermore, the comparison performed at step 300 may be performed at one of the edgepoints (e.g., the egress edgepoint) or at another component within the domain (e.g., a node or a call quality monitor).

While the method begins with comparing media quality reports, the frequency with which media quality reports are compared may vary. For example, the media quality reports may be compared for every communication that passes through the domain, the media quality reports may be compared on a periodic or random sampling basis, they may only be compared when there is a concern about the quality of a communication (either an edgepoint of the domain detected a low quality communication or an end-to-end quality report indicating receipt of a poor quality communication is sniffed), or they may be compared using some combination of the above. Thus, while the media quality reports are called first and second media quality reports, this is simply to distinguish between the two media quality reports and does not indicate when they were received (e.g., the first media quality report may be the fiftieth media quality report received, or the tenth media quality report compared).

At step 310 it is determined whether the difference between the quality detailed in the first media quality report and the quality detailed in the second media quality report exceeds a first threshold. As discussed above, the first and second media quality reports may contain a wide variety of diagnostic and/or quality information; thus, depending on the embodiment, the first threshold may be based on a single aspect or a combination of several/all of the aspects of the media quality report. For example, if the second endpoint sends an RTP or RTCP report indicating that the quality of certain aspects of the first communication have become degraded (e.g., the RTP/RTCP report may contain information obtained from one or more of the metrics discussed above), then the first threshold may be based on those aspects. Thus, at step 310 it would be determined whether those certain aspects of the first communication identified in the RTP/RTCP report from the second endpoint were more than the first threshold better as they entered the domain than when they left. As a second example, several different aspects of the quality of the first communication at the ingress and egress edgepoints of the domain may be compared to determine if the difference between the aggregations of these several different aspects exceeds the first threshold.

If the difference exceeds the first threshold, then at step 315 the path used by the first communication is determined. This may involve the ingress node initiating a layer three trace route. The trace route may be initiated by the ingress node because, as discussed above, the path between two edgepoints may not necessarily be the same in both directions.

At step 320 the source causing the difference between media quality reports is isolated. As may be apparent, there may be several components that contribute to the quality degradation. Accordingly the cause that is isolated at step 320 may not be a single component. Isolating the cause of the degradation may vary depending on the diagnostic/trouble shooting capabilities of the individual components of the domain as well as the general setup provisioned by the domain administrator. One way to isolate the cause of the degradation is to collect diagnostic information for each component and/or hop along the path determined at step 315. For example, the same edgepoint that initiated the trace route may establish a series of synthetic media stream segment tests with the components along the path. The results may then be used to determine which portions of the path likely contributed to the degradation of the first communication. The results may be stored in a log for later retrieval by a domain administrator, compiled into a periodic report to be presentment to the domain administrator, or used in any other desired archiving or notification task.

If the difference does not exceed the first threshold then it may be concluded that any degradation that occurred to the first communication occurred outside of this domain. At step 325 a message is received indicating that the quality of the first communication has degraded. This message may be from the second endpoint, thus indicating that the end-to-end quality of the first communication has degraded. In some embodiments, the message may be an RTP report or an RTCP report. For example, en edgepoint or a CQMS may sniff an end-to-end quality report sent between endpoints. In some instances this may be the first indication that the first communication has experienced quality degradation (e.g., the degradation occurred after the first communication left this domain).

At step 330 it is determined whether the first media quality report and the second media quality report indicate that the first communication was of acceptable quality. As before in step 310, whether both reports indicate the first communication was of acceptable quality may be based on an aggregation of several or all of the information in the media quality reports or it may be based on a selection of certain pieces of information (e.g., those metrics that are the same, or related to, the metric(s) that was reported as being unacceptable in the RTP report).

If both reports indicate the first communication was acceptable, then at step 335 a message indicating that the degradation occurred downstream is generated; and if both reports indicate the first communication was not acceptable, then at step 340 a message indicating that the degradation occurred upstream is generated. In other words an assumption is made that if the first communication was of poor quality when it entered and left the domain then it must have been degraded before it arrived at this domain, and if the communication was of an acceptable quality when it entered and left this domain then the degradation indicated by the message received at step 325 must have occurred downstream after the first communication left this domain. In particular embodiments, the message may be sent to the domain administrator, either directly (e.g., via an email or in a status report) or indirectly (e.g., the message may be stored in a log which may be accessed by the domain administrator). In some embodiments, the message may be sent to other components, such as endpoints one or two or a node or edgepoint within an upstream or downstream domain (e.g., if the degradation occurred downstream, the message may be sent to a call quality monitor from the next downstream domain).

Some of the steps illustrated in FIG. 3 may be combined, modified or deleted where appropriate, and additional steps may also be added to the flowchart. Additionally, steps may be performed in any suitable order without departing from the scope of this disclosure.

Although particular embodiments have been described in detail with reference to particular embodiments, it should be understood that various other changes, substitutions, and alterations may be made hereto without departing from the spirit and scope of this disclosure. For example, although the particular embodiments have been described with reference to a number of elements included within communication system 30 and edgepoint 230*a*2, these elements may be combined, rearranged or positioned in order to accommodate particular routing architectures or needs. In addition, any of these elements may be provided as separate external components to communication system 30, edgepoint 230*a*2 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments of the present invention encompass all such changes, substitutions, variations, alterations and modifications as falling within the spirit and scope of the appended claims.

What is claimed is:

1. A method comprising:
    comparing, at a call quality monitoring device, a first media quality report for a communication from a first node with a second media quality report for the communication from a second node, the first node comprising an ingress node of a first domain for the communication and the second node comprising an egress node of the first domain for the communication;
    determining that a difference between at least one aspect value of the first media quality report and at least one corresponding aspect value of the second media quality report exceeds a first threshold;
    upon determining that the difference exceeds the first threshold:
        determining a first path between the first node and the second node used by the communication, the first path comprising a plurality of nodes between the first node and the second node; and
        isolating at least one source from among the plurality of nodes between the first node and the second node causing the difference between the first media quality report and the second media quality report;
    determining whether both the first media quality report and the second media quality report indicate that the at least one quality characteristic of the communication is above a second threshold;
    upon determining that both the first media quality report and the second media quality report indicate that the at least one quality characteristic of the communication is above the second threshold, generating a message indicating that the degradation of the communication occurred downstream of the egress node; and
    upon determining that both the first media quality report and the second media quality report indicate that the at least one quality characteristic of the communication is below the second threshold, generating a message indicating that the degradation of the communication occurred upstream of the ingress node.

2. The method of claim 1, further comprising receiving a message indicating that the quality of the communication has degraded such that at least one quality characteristic of the communication is below a third threshold, wherein the determination of whether both the first media quality report and the second media quality report indicate that the at least one quality characteristic of the communication is above the second threshold is made in response to the message.

3. The method of claim 1, wherein comparing the first media quality report for the communication from the first node with the second media quality report for the communication from the second node comprises comparing the first media quality report for the communication from the first node with the second media quality report for the communication from the second node on a basis selected from the group consisting of a periodic basis, a random sampling basis, an every communication basis, and a delayed basis a first amount of time after the start of a communication session.

4. The method of claim 1, wherein determining the first path between the first node and the second node used by the communication comprises initiating a layer 3 trace route from the first node to the second node.

5. The method of claim 1, wherein isolating at least one source causing the difference between the first media quality report and the second media quality report comprises generating at least one synthetic media stream path segment test along the path between the first node and the second node used by the communication.

6. The method of claim 1, wherein the communication is part of a real-time communication session.

7. A system comprising, a processor implemented via at least hardware and configured to:
    compare a first media quality report for a communication from a first node with a second media quality report for the communication from a second node, the first node comprising an ingress node of a first domain for the communication and the second node comprising an egress node of the first domain for the communication; and
    determine whether a difference between at least one aspect value of the first media quality report and at least one corresponding aspect value of the second media quality report exceeds a first threshold;
    upon determining that the difference exceeds the first threshold:
        determine a first path between the first node and the second node used by the communication, the first path comprising a plurality of nodes between the first node and the second node; and
        isolate at least one source from among the plurality of nodes between the first node and the second node causing the difference between the first media quality report and the second media quality report;
    upon determining that the difference does not exceed the first threshold, determine whether both a first media quality report and the second media quality report indicate that the at least one quality characteristic of the communication is above a second threshold;

upon determining that both the first media quality report and the second media quality report indicate that the at least one quality characteristic of the communication is above the second threshold, generate a message indicating that the degradation of the communication occurred downstream of the egress node; and upon determining that both the first media quality report and the second media quality report indicate that the at least one quality characteristic of the communication is below the second threshold, generate a message indicating that the degradation of the communication occurred upstream of the ingress node.

8. The system of claim 7, further comprising an interface coupled to the processor and configured to receive a message indicating that the quality of the communication has degraded such that at least one quality characteristic of the communication is below a third threshold, wherein the determination of whether both the first media quality report and the second media quality report indicate that the at least one quality characteristic of the communication is above the second threshold is made in response to receiving the message.

9. The system of claim 7, wherein the processor configured to compare the first media quality report for the communication from the first node with the second media quality report for the communication from the second node comprises the processor configured to compare the first media quality report for the communication from the first node with the second media quality report for the communication from the second node on a basis selected from the group consisting of a periodic basis, a random sampling basis, an every communication basis, and a delayed basis for a first amount of time after the start of a communication session.

10. The system of claim 7, wherein the processor configured to determine the first path between the first node and the second node used by the communication comprises a processor configured to initiate a layer 3 trace route from the first node to the second node.

11. The system of claim 7, wherein the processor configured to isolate at least one source causing the difference between the first media quality report and the second media quality report comprises a processor configured to generate at least one synthetic media stream path segment test along the path between the first node and the second node used by the communication.

12. The system of claim 7, wherein the communication is part of a real-time communication session.

13. One or more tangible non-transitory computer readable media comprising logic that when executed by a processor is configured to:
compare a first media quality report for a communication from a first node with a second media quality report for the communication from a second node, the first node comprising an ingress node of a first domain for the communication and the second node comprising an egress node of the first domain for the communication;
determine whether a difference between at least one aspect value of the first media quality report and at least one corresponding aspect value of the second media quality report exceeds a first threshold;
upon determining that the difference exceeds the first threshold:
determine a first path between the first node and the second node used by the communication, the first path comprising a plurality of nodes between the first node and the second node; and
isolate at least one source from among the plurality of nodes between the first node and the second node causing the difference between the first media quality report and the second media quality report;

upon determining that the difference does not exceed the first threshold, determine whether both the first media quality report and the second media quality report indicate that the at least one quality characteristic of the communication is above a second threshold;

upon determining that both the first media quality report and the second media quality report indicate that the at least one quality characteristic of the communication is above a second threshold, generate a message indicating that the degradation of the communication occurred downstream of the egress node; and upon determining that both the first media quality report and the second media quality report indicate that the at least one quality characteristic of the communication is below the second threshold, generate a message indicating that the degradation of the communication occurred upstream of the ingress node.

14. The tangible media of claim 13, wherein the logic is further configured to receive a message indicating that the quality of the communication has degraded such that at least one quality characteristic of the communication is below a third threshold, wherein the determination of whether both the first media quality report and the second media quality report indicate that the at least one quality characteristic of the communication is above the second threshold is made in response to the message.

15. The tangible media of claim 13, wherein the logic configured to compare the first media quality report for the communication from the first node with the second media quality report for the communication from the second node comprises logic configured to compare the first media quality report for the communication from the first node with the second media quality report for the communication from the second node on a basis selected from the group consisting of a periodic basis, a random sampling basis, an every communication basis, and a delayed basis a first amount of time after the start of a communication session.

16. The tangible media of claim 13, wherein the logic configured to determine the first path between the first node and the second node used by the communication comprises logic configured to initiate a layer 3 trace route from the first node to the second node.

17. The tangible media of claim 13, wherein the logic configured to isolate at least one source causing the difference between the first media quality report and the second media quality report comprises logic configured to generate at least one synthetic media stream path segment test along the path between the first node and the second node used by the communication.

18. The tangible media of claim 13, wherein the communication is part of a real-time communication session.

19. A method comprising:
comparing, at a call quality monitoring device, a first media quality report for a communication from a first node with a second media quality report for the communication from a second node, the first node comprising an ingress node of a first domain for the communication and the second node comprising an egress node of the first domain for the communication;
determining that the difference between at least one aspect of the first media quality report and at least one corresponding aspect of the second media quality report exceeds a first threshold;
upon determining that the difference exceeds the first threshold:

determining a first path between the first node and the second node used by the communication; and isolating at least one source causing the difference between the first media quality report and the second media quality report;

receiving a message indicating that the quality of the communication has degraded such that at least one quality characteristic of the communication is below a second threshold;

upon determining that both the first media quality report and the second media quality report indicate that the at least one quality characteristic of the communication is above a third threshold, generating a message indicating that the degradation of the communication occurred downstream of the egress node; and upon determining that both the first media quality report and the second media quality report indicate that the at least one quality characteristic of the communication is below a fourth threshold, generating a message indicating that the degradation of the communication occurred upstream of the ingress node.

* * * * *